United States Patent [19]

Mizusawa

[11] Patent Number: 4,776,486
[45] Date of Patent: Oct. 11, 1988

[54] DEVICE FOR HOLDING AUTOMOBILE FUEL-TANK FILLER PORT CAP

[75] Inventor: Akira Mizusawa, Yokohama, Japan
[73] Assignee: Nifco, Inc., Yokohama, Japan
[21] Appl. No.: 6,370
[22] Filed: Jan. 23, 1987
[30] Foreign Application Priority Data
  Feb. 14, 1986 [JP] Japan .............................. 61-18751[U]
[51] Int. Cl.[4] .............................................. B65D 55/16
[52] U.S. Cl. .................................. 220/375; 220/332; 220/343; 220/DIG. 33
[58] Field of Search ....... 220/375, 343, 332, DIG. 33; 222/543, 545, 556, 558; 296/1 C

[56] References Cited
U.S. PATENT DOCUMENTS
  3,750,825  8/1973  Bachle ............................... 296/1 C
  4,320,853  3/1982  Moore ................................. 220/375

Primary Examiner—Stephen Marcus
Assistant Examiner—Nova Stucker
Attorney, Agent, or Firm—Trexler, Bushnell, Giangiorgi & Blackstone, Ltd.

[57] ABSTRACT

A device for holding an automobile fuel-tank filler port cap comprises a mounting member secured to a position near the filler port, a ring-like holding member rotatably fitted in an annular groove of the cap, and a connecting member connecting the mounting and holding members. The connecting and holding members are folded over the mounting member when the cap is fitted on the filler port. When the cap is removed, all the members are extended into a strip-like form to hold the cap in a hanging state.

3 Claims, 6 Drawing Sheets

FIG. 7
FIG. 8
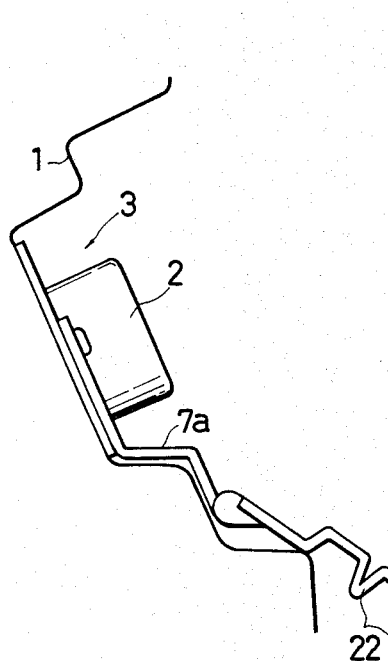
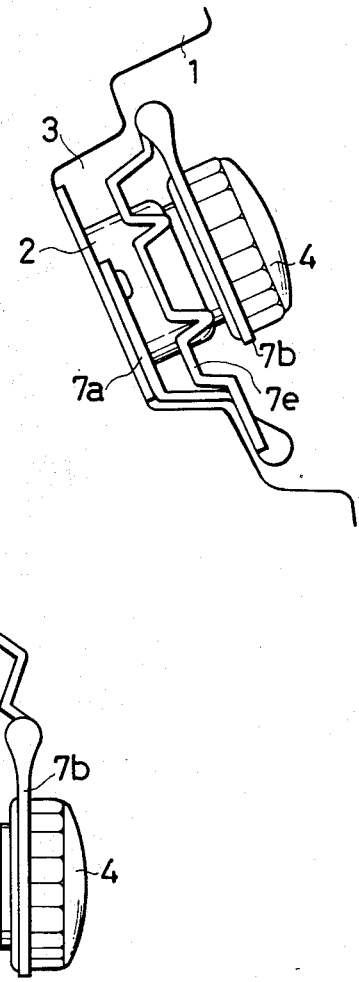
FIG. 9
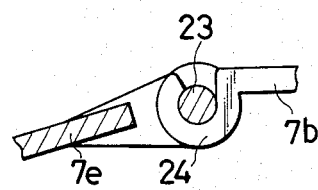

DEVICE FOR HOLDING AUTOMOBILE FUEL-TANK FILLER PORT CAP

FIELD OF THE INVENTION AND RELATED ART STATEMENT

This invention relates to a device for holding an automobile fuel-tank filler port cap connected to the automobile body.

The fuel-tank filler port of an automobile usually opens inside a recess formed by recessing the automobile body surface. The recess is covered by a lid which is usually lockable.

The covering of the filler port with the lid is mainly for thwarting thieves and ensuring safety. Since the filler port cap is covered by the lid, it is usually made to be readily removable after the lid has been opened.

The cap closing the automobile fuel-tank filler port is protected by the lid so that it will not be lost even if it should come off. Sometimes, however, a gasoline station attendant or the vehicle operator forgets to replace the cap after fueling up. In such a case, the fuel is left to gasify, thus leading to a dangerous situation.

Particularly, if a station attendant should fail to replace and tighten the cap after fuel has been supplied, the driver is liable to continue driving for a long time without knowing this and hence an extremely dangerous situation arises.

In a truck having a fuel tank mounted in an exposed state, the cap is held connected by a chain or the like to the filler port in order to avoid its loss. In the case of an automobile having a lid for covering the filler port, however, such a chain or other connecting member would obstruct the operation of removing and replacing the cap because it hangs down. Particularly, since the filler port is often provided on an upright side surface of the automobile body, such inconvenience is often encountered. Therefore, it becomes very cumbersome to manipulate the hanging connecting member, and the lid is liable to be damaged when the lid is imperfectly closed due to the presence of the connecting member or when excessive force is applied to the lid in the imperfectly closed state.

OBJECT AND SUMMARY OF THE INVENTION

One object of the invention is to provide a device for holding an automobile fuel-tank filler port cap, which is capable of being accommodated in a small space and easy to handle.

Another object of the invention is to provide a device for holding an automobile fuel-tank filler port cap, which is capable of reliably holding the cap removed from the filler port without causing the removed cap to mar or scratch the automobile body surface.

According to the invention, there is provided a device for holding an automobile fuel-tank filler port cap, which comprises a mounting member secured to a position near the filler port, a ring-like holding member rotatably fitted in an annular groove of the cap, and a connecting member connecting the mounting and holding members, the connecting member being rotatably coupled by connecting pins to the mounting and holding members, the connecting and holding members being folded over the mounting member when the cap is fitted on the fuel supply port, the individual members being extended into a strip-like form when the cap is removed.

With the holding device according to the invention, when fitting the cap on the filler port and closing the same, the connecting and holding members are folded in the mentioned order about connecting pins and overlapped over the mounting member, and the device is thus accommodated in the folded state to permit a lid covering the filler port to be closed smoothly. When removing the cap, the individual members of the device are unfolded about the pins and extended to hold the cap in a hanging state. The cap thus remains attached to the car body, so that loss thereof is prevented. Also, since the removed cap suspended by the device is most conspicuous, the chances of someone forgetting to replace the cap are very small.

The above and other objects and features of the invention will become more apparent from the following detailed description with reference to the accompanying drawings.

BRIEF DESCRIPTION OF THE DRAWINGS

FIG. 7 is a side view showing the same holding device;

FIG. 8 is a side view showing the same device with the cap fitted on the filler port to close the port; and FIG. 9 is a view, to an enlarged scale, showing a connecting member in the holding device of FIG. 6.

DETAILED DESCRIPTION OF THE PREFERRED EMBODIMENTS

Figure 1:
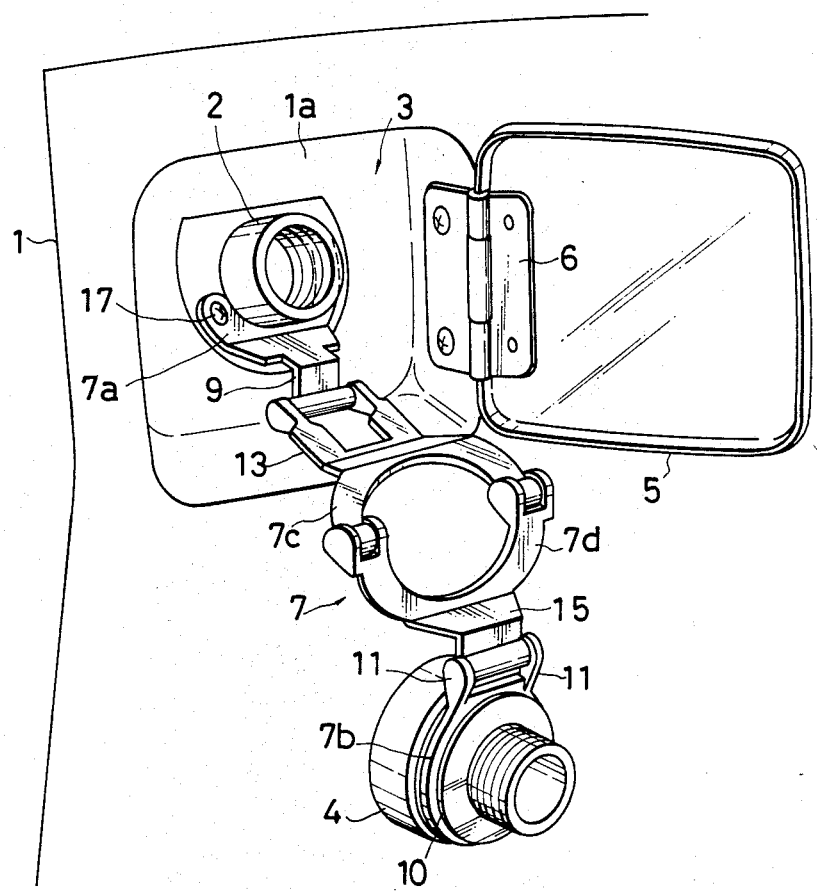
FIG. 1 is a perspective view showing a first embodiment of the holding device according to the invention, with a cap shown removed from a filler port.
Figure 2:
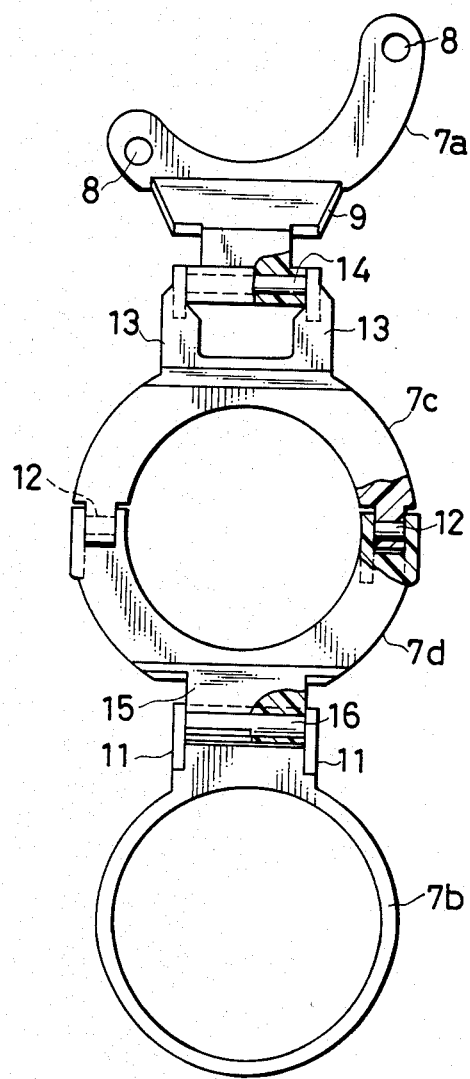
FIG. 2 is a front view, partly in section, showing the holding device of FIG. 1 in an extended state.
Figure 3:
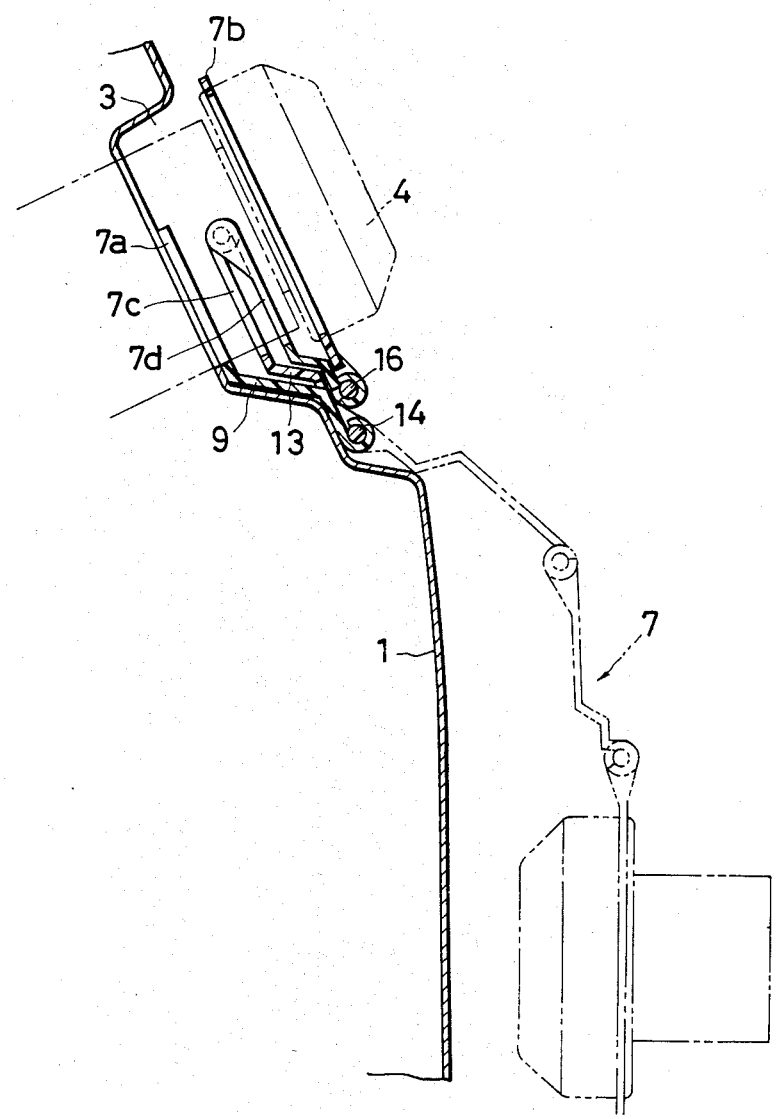
FIG. 3 is a side sectional view showing the same holding device with the cap fitted on the filler port to close the same.

FIGS. 1 to 3 illustrate an embodiment of the device for holding a fuel-tank filler cap according to the invention. More specifically, FIG. 1 is a perspective view showing the embodiment with the cap removed, FIG. 2 is a front view, partly in section, showing the embodiment of the device in an extended state, and FIG. 3 is a longitudinal sectional view showing the device in a folded and accommodated state. Referring to the figures, reference numeral 1 designates an automobile body, numeral 2 a fuel-tank filler port opening within a recess 3 formed by recessing an upright side wall portion of the automobile body 1, numeral 4 a cap for fitting on the filler port, numeral 5 a lid hinged by a hinge 6 to one side edge of the opening of the recess 3, and numeral 7 a holding device according to the invention, which is secured to a plate-like wall 1a of the body 1 surrounding the filler port 2 to hold the cap 4 connected to the body 1.

This embodiment of the holding device 7 comprises four members, i.e., a mounting member 7a directly secured to the body, a holding member 7b for holding the cap 4 and first and second connecting members 7c and 7d for connecting the members 7a and 7b.

The holding member 7b is ring-like, and is loosely fitted in an annular groove 10 formed in the back surface of a grip of the cap 4. The holding member 7b is fitted such that the cap can be freely rotated with respect thereto. The holding member 7b has two arms 11 which project from its outer periphery and are coupled to the second connecting member 7d.

The first and second-connecting members 7c and 7d are both semi-circular in shape, and their open mating ends are rotatably coupled together by pins 12 to constitute a ring. The first connecting member 7c has two arms 13 projecting from a central portion of its outer surface. An arm 9 of the mounting member 7a is received between the arms 13. The arm 9 and the arms 13 are rotatably coupled together by a pin 14. The second connecting member 7d has an arm 15 projecting from a central portion of its outer surface. The arm 15 is received between the two arms 11 of the holding member 7b and is rotatably coupled thereto by a pin 16. Thus, the four members are assembled together into a strip-like form by the three coupling pins 14, 12 and 16.

The four members are flat and have small thickness so that the overall thickness of the device will be small in the folded state. The arms 9, 13 and 15 have predetermined bent shapes so that when folded the four members can be accommodated in a small space within the recess 3 surrounding the filler port 2. Also, the arms have different lengths so that the pins 14 and 16 are spaced apart and extend in parallel when the four members are folded (see FIG. 3).

The holding device having the above construction according to the invention is mounted by fitting the holding member 7b in the groove 10 of the cap 4 and attaching the mounting member 7a to the body wall 1a surrounding the filler port 2 by passing screws 17 through holes 8 in the mounting member 7a and corresponding holes (not shown) in the wall 1a.

With this holding device 7, when fitting the cap 4 on the filler port 2 and tightening it to close the port, the device is folded about the pins 12, 14 and 16 to be accommodated in the recess surrounding the filler port.

FIG. 3 shows the device in the accommodated state. In this state, the two connecting members 7c and 7d are folded together about the pin 12 and surround one half the circumference of the filler port.

When removing the cap for supplying fuel, the folded device is unfolded with the removal of the cap and hangs down to hold the cap in a hanging state.

Figure 4:
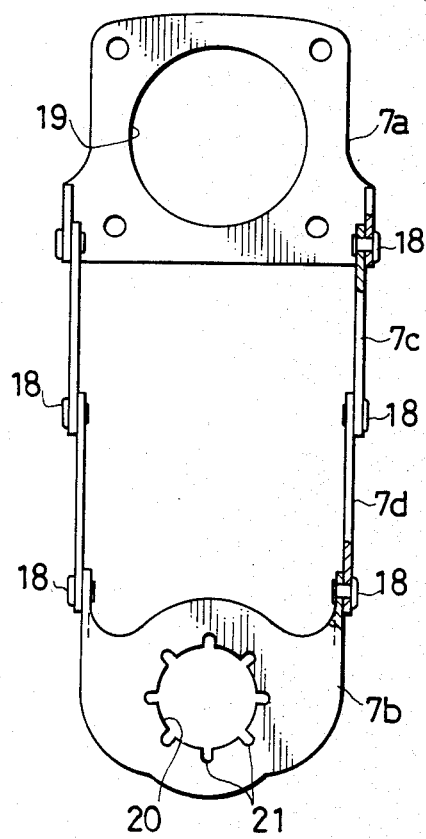
FIG. 4 is a front view, partly in section, showing a second embodiment of the holding device according to the invention in an extended state.
Figure 5:
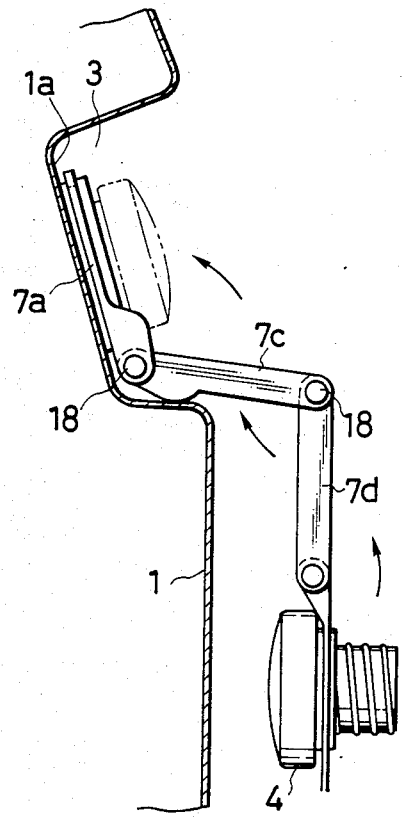
FIG. 5 is a side sectional view showing the same holding device in an extended state.
Figure 6:
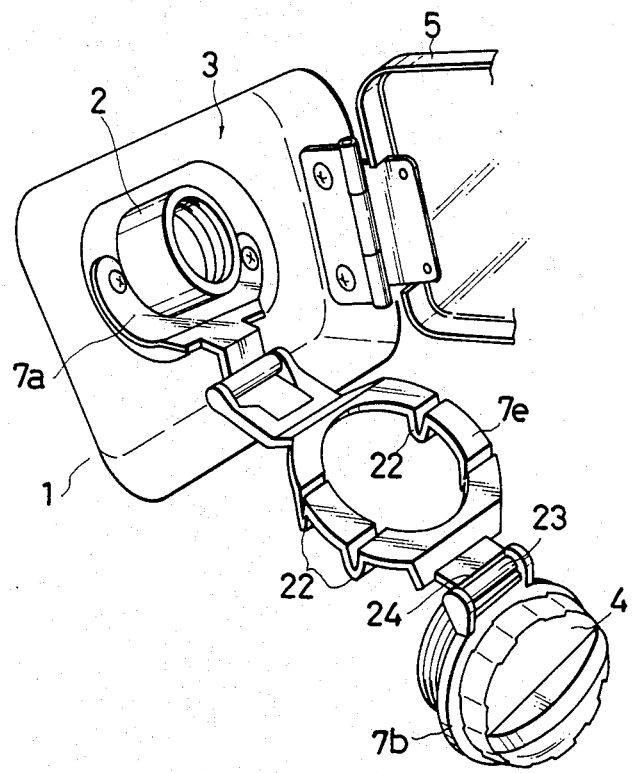
FIG. 6 is a perspective view showing a third embodiment of the holding device according to the invention with a cap shown removed from a filler port and held hanging.

FIGS. 4 and 5 show a second embodiment of the holding device according to the invention. In this embodiment, first and second connecting members 7c and 7d each consist of two parallel arms. The mating ends of the connecting members are rotatably coupled together by rivet-like pins 18. The mounting and holding members 7a and 7b are flat and plate-like. The mounting member 7a has a central hole 19, and it is directly secured to a plate-like wall defining a recess in the body 1 with the hole 19 fitted around the filler port 2. The holding member 7b has a central through hole 20, and is fitted in the groove 10 of the cap 4. The edge of the hole 20 is formed with a plurality of notches 21 to permit enlargement of the hole.

The second embodiment of the device enables the first and second connecting members 7c and 7d to be accommodated in the small space on the opposite sides of the filler port 2 when the individual members of the device are folded. Another feature of this embodiment is that when it is unfolded, a portion of the first connecting member 7c near the proximal end thereof comes into contact with the edge of the recess 3, while the second connecting member 7d is suspended from the first connecting member 7c so that the suspended cap 4 will not touch the surface of the body 1. This embodiment is used in the same way and provides the some effects as the first embodiment.

FIGS. 6 to 9 show a third embodiment of the invention. In this embodiment, a single connecting member 7e is used in place of the first and second connecting members 7c, 7d in the first and second embodiments. The connecting member 7e is capable of expansion and contraction to avoid the engagement of the connecting member 7e with the filler port 2 when the device is accommodated in the folded state.

The mounting member 7a and holding member 7b, the former for being directly secured to the body 1 and the latter for being fitted in the groove of the cap 4 to rotatably hold the cap, are the same as in the first embodiment. In this embodiment, the two members 7a and 7b are connected by the single connecting member 7e which is ring-like and has a sufficient inner diameter to pass over the filler port 2. The connecting member 7e is rotatably coupled by pins to the mounting and holding members 7a and 7b.

The connecting member 7e has four bent portions 22, two on each side, for length adjustment. That is, the inner diameter of the connecting member 7e can be varied with the expansion and contraction of the bent portions.

With this embodiment of the device, when the cap 4 is removed, the connecting member 7e is turned out substantially by 180 degrees about the mounting member 7a so that it projects from the recess 3 and the holding member 7b holding the cap 4 hangs from the connecting member 7e, as shown in FIG. 7. When fitting the cap on the filler port, the connecting member 7e is foldedly overlapped over the mounting member 7a to guide the cap 4 to the filler port 4, as shown in FIG. 8.

When fitting the cap, the connecting member 7e is fitted on the outer periphery of the filler port 2 as the device is folded. Therefore, if there is any error produced in the assembly of the device, the connecting member is liable to strike the top of the filler port 2 to interfere with the folding operation. In this embodiment, since the connecting member 7e is provided with the bent portions 22, its inner diameter can thus be increased when the cap is replaced, and it can be smoothly overlapped over the mounting member 7a at all times.

FIG. 9 is a view, to an enlarged scale, showing a coupling section by which the connecting member 7e is coupled by a pin 23 to the holding member 7b. The pin 23 and a bearing 24 are provided on the respective members; here the pin 23 is provided on the connecting member 7e and the bearing 24 on the holding member 7b. The two members are rotatably coupled together by fitting the pin 23 in the bearing 24 through a notch formed therein. This method of coupling may also be utilized for the coupling between the connecting member 7e and the mounting member 7a, and can further be applied in the first and second embodiments as well, thus enhancing the manufacturing ease.

The invention concerns a holding device for connecting a filler port cap to an automobile body, and according to the invention the individual members of the device are folded about the connecting pins and accommodated in a small space within the recess when the cap is fitted on the filler port. Thus, the device will not obstruct the operation of closing the lid. When the cap is removed to supply fuel, the device is extended to the outside of the recess to hold the cap suspended under the filler port. Therefore, there is no problem of encountering a situation where there is no place to place the cap, and loss of the cap is prevented.

Further, since the cap is held hanging by the holding device, there is no possibility of closing the lid without replacing the cap, and it is possible to eliminate the danger of driving with the filler port open.

Further, failure to replace the cap can be immediately noticed since the cap hangs and the lid is open. This is a very effective alarm means for avoiding danger.

Further, the device according to the invention is accommodated so as to surround the filler port when the individual members are folded about the connecting pins so, unlike the conventional chain, it will not dangle once the cap replaced. Thus, it will not interfere with the operation of closing the lid, and can be used very conveniently.

Further, when it is extended to remove the cap, the cap is suspended outside the car body by the connecting member, so that it does not mar or scratch the body surface.

What is claimed is:

1. A device for holding an automobile fuel tank filler port cap, comprising a mounting member secured to a position near the filler port, a substantially flat ring-like holding member rotatably fitted in an annular groove of the cap, a connecting member connecting said mounting and holding members, and at least one coupling pin rotatably connecting said connecting member to each of said mounting and holding members, said connecting member and holding member being folded over said mounting member and arcuately disposed about said filler port when the cap is fitted on the filler port, and all of said members being extended into a strip-like form when the cap is removed with said cap disposed below said filler port.

2. A device as set forth in claim 1 wherein said connecting member comprises two hingedly connected semi-circular portions.

3. A device as set forth in claim 1 wherein said connecting member is provided with upstanding reentrant portions permitting expansion and contraction of the diameter of said connecting member.

* * * * *